United States Patent
Gupta et al.

(10) Patent No.: US 7,302,389 B2
(45) Date of Patent: Nov. 27, 2007

(54) AUTOMATIC ASSESSMENT OF PHONOLOGICAL PROCESSES

(75) Inventors: Sunil K. Gupta, Edison, NJ (US); Prabhu Raghavan, Edison, NJ (US); Chetan Vinchhi, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 922 days.

(21) Appl. No.: 10/637,235

(22) Filed: Aug. 8, 2003

(65) Prior Publication Data

US 2004/0230430 A1 Nov. 18, 2004

Related U.S. Application Data

(63) Continuation-in-part of application No. 10/438,142, filed on May 14, 2003.

(51) Int. Cl.
 *G10L 15/26* (2006.01)
(52) U.S. Cl. .................. 704/235; 704/257; 704/243; 704/250
(58) Field of Classification Search ............... 704/235, 704/260, 270, 244, 243, 257, 250
 See application file for complete search history.

(56) References Cited

U.S. PATENT DOCUMENTS

| | | | |
|---|---|---|---|
| 4,615,680 A | 10/1986 | Tomatis | 434/157 |
| 4,631,746 A | 12/1986 | Bergeron et al. | 381/35 |
| 4,783,802 A | 11/1988 | Takebayashi et al. | 381/41 |
| 5,815,639 A * | 9/1998 | Bennett et al. | 704/235 |
| 5,926,787 A * | 7/1999 | Bennett et al. | 704/235 |
| 5,946,654 A | 8/1999 | Newman et al. | 704/246 |
| 5,963,903 A | 10/1999 | Hon et al. | 704/254 |
| 5,983,177 A * | 11/1999 | Wu et al. | 704/244 |
| 5,995,932 A | 11/1999 | Houde | 704/261 |
| 6,108,627 A * | 8/2000 | Sabourin | 704/243 |
| 6,151,575 A | 11/2000 | Newman et al. | 704/260 |
| 6,163,768 A | 12/2000 | Sherwood et al. | 704/235 |
| 6,243,680 B1 * | 6/2001 | Gupta et al. | 704/260 |
| 6,272,464 B1 * | 8/2001 | Kiraz et al. | 704/257 |
| 6,358,054 B1 | 3/2002 | Rothenberg | 434/185 |
| 6,389,395 B1 | 5/2002 | Ringland | 704/254 |

(Continued)

OTHER PUBLICATIONS

"A Modern Approach to Dysarthria Classification" by Eduardo Castillo Guerra et al., Proceedings of the 25th Annual International Conference of the IEEE EMBS, Cancun, Mexico, Sep. 17-21, 2003, 5 pages.

(Continued)

*Primary Examiner*—Vijay Chawan

(57) ABSTRACT

A computer-based system generates alternative phonetic transcriptions for a target word or phrase corresponding to specific phonological processes that replace individual phonemes or clusters of two or more phonemes with replacement phonemes. The system compares a user's speech with a list of possible transcriptions that includes the base (i.e., correct) transcription of the test target as well as the different alternative transcriptions, to identify the transcription that best matches the user's. In a speech therapy application, the system identifies the phonological process(es), if any, associated with the user's speech and generates statistics over multiple test targets that can be used to diagnose the user's specific phonological disorders. The system can also be implemented in other contexts such as foreign language instruction and automated attendant applications to cover a wide variety and range of accents and/or phonological disorders.

23 Claims, 5 Drawing Sheets

U.S. PATENT DOCUMENTS

| | | | |
|---|---|---|---|
| 6,434,521 B1 | 8/2002 | Barnard | 704/244 |
| 6,585,517 B2 | 7/2003 | Wasowicz | 434/167 |
| 6,714,911 B2 | 3/2004 | Waryas et al. | 704/271 |
| 6,912,498 B2 * | 6/2005 | Stevens et al. | 704/235 |
| 6,952,673 B2 * | 10/2005 | Amir et al. | 704/235 |
| 7,149,690 B2 | 12/2006 | August et al. | 704/270 |
| 2002/0111805 A1 * | 8/2002 | Goronzy et al. | 704/250 |
| 2002/0184009 A1 | 12/2002 | Heikkinen | 704/219 |
| 2003/0182106 A1 | 9/2003 | Bitzer et al. | 704/207 |

OTHER PUBLICATIONS

"Diagnosis of Vocal and Voice Disorders by the Speech Signal." by Carlos Hernandez-Espinosa et al., Neural Networks, 2000. IJCNN 2000, Proceedings of the IEEE-International Joint Conference on Jul. 24-27, 2000, vol. 4, 7 pages.

"Computer Assisted Treated for Motor Speech Disorders" by Selim S. Awad, Ph.D. et al., 1999 IEEE, pp. 595-600. Instrumentation and Measurement Technology Conference, IMTC/99, Proceedings of the 16th IEEE.

"Automatic babble recognition for early detection of speech related disorders" by Harriet J. Fell et al., Behaviour & Information Technology, 1999, vol. 18, No. 1, pp. 56-63.

"Acoustical recognition of laryngeal pathology using the fundamental frequency and the first three formants of vowels" by E. Perrin et al., Medical & Biological Engineering & Computing, Jul. 1997, vol. 35, No. 4, 9 pages.

"Spectral Pattern Recognition of Improved Voice Quality" by Heikki Rihkanen et al., Journal of Voice, vol. 8, No. 4, 1994, pp. 320-326.

"Dysphonia Detected by Pattern Recognition of Spectral Composition" by Lea Leinonen et al., Journal of Speech and Hearing Research, vol. 35, Apr. 1992, pp. 287-295.

"Time-Domain Algorithms for Harmonic Bandwidth Reduction and Time Scaling of Speech Signals" by David Malah, IEEE Transactions on Acoustics, Speech, and Signal Processing, vol. ASSP-27, No. 2, Apr. 1979, pp. 121-133.

"Wavelet-FILVQ Classifier for Speech Analysis" by G. Van de Wouwer et al., 5 pages. Proceedings in the 13th annual conference on pattern recognition 1996.

"Automatic Detection and Segmentation of Pronunciation Variants in German Speech Corpora" by Andreas Kipp et al., pp. 106-109. ICSLP96.

"Automatic Recognition of Dutch Dysarthic Speech a Pilot Study" by Eric Sanders et al., 4 pages. In Proc. Internat. Conf. Spoken Language Processing 2002.

* cited by examiner

AUTOMATIC ASSESSMENT OF PHONOLOGICAL PROCESSES

CROSS-REFERENCE TO RELATED APPLICATIONS

This is a continuation-in-part of co-pending application Ser. No. 10/438,142, filed on May 14, 2003, the teachings of which are incorporated herein by reference. The subject matter of this application is also related to U.S. patent application Ser. No. 10/188,539 filed Jul. 03, 2002, the teachings of which are incorporated herein by reference.

BACKGROUND OF THE INVENTION

1. Field of the Invention

The present invention relates generally to signal analysis devices and, more specifically, to a method and apparatus for improving the language skills of a user.

2. Description of the Related Art

In automatic speech recognition (ASR), a computer-implemented algorithm compares a user's spoken input to a database of speech templates to identify the words and phrases spoken by the user. ASR has many potential applications, including use in automated attendants, speech and language therapy, and foreign language instruction.

When used in an automated attendant application, the ASR algorithm should ideally be able to recognize spoken inputs from users having different accents. The current state of the art makes use of speech templates trained from a large database of spoken inputs corresponding to various accents and using other compensation techniques to improve recognition performance for people with accents.

Unfortunately, in addition to the expense involved in gathering spoken inputs for a wide variety of different accents, the resulting ASR algorithm typically sacrifices quality for quantity. That is, while the ASR algorithm might be able to function at some specified level for more users having a wider range of accents, the ASR algorithm also tends to have a decreased ability to recognize the speech from a user having a particular accent than would be the case if the ASR algorithm relied on speech templates based solely on that particular accent. As a result, the automated attendant might not be able to operate with sufficient accuracy for any of its users, no matter what their accents.

During the past few years, computer-based ASR tools have also been used for speech and language therapy and for foreign language instruction. Although currently available computer-based programs offer several useful features, such as therapy result analysis, report generation, and multimedia input/output, they all have a few key problems that limit their use to the classroom or therapist's office. These problems include: (a) no automatic assessment of phonological disorders; (b) no ability to easily and automatically customize the stimulus material for the specific needs of a student/patient; and (c) high cost. Most speech therapy programs are relatively expensive so as to make them unaffordable for use at home. Since most learning by children occurs when their parents are intimately involved in their therapy or language education, cost barriers to home use can result in less effective therapy/education.

SUMMARY OF THE INVENTION

Problems in the prior art are addressed in accordance with the principles of the invention by a computer-based ASR tools that is capable of recognizing spoken inputs from users having a wide variety of accents and/or phonological disorders.

In one embodiment, the ASR tool is a computer system comprising an alternative pronunciation (AP) generator, a speech recognition (SR) engine, and a score management (SM) module.

The AP generator is adapted to generate one or more alternative pronunciations (i.e., phonetic transcriptions) for a target (e.g., a word or phrase). For one or more base phonemes/clusters in the target, one or more replacement phonemes/clusters are selected corresponding to one or more phonological processes, and the one or more alternative transcriptions are generated from different combinations of base phonemes/clusters and replacement phonemes/clusters.

The SR engine is adapted to (1) compare a user's speech for one or more targets to one or more corresponding lists of possible phonetic transcriptions (generated by the AP generator) that include a base transcription for each target and the one or more alternative transcriptions and (2) identify a transcription in the one or more lists that best matches the user's speech.

The SM module is adapted to characterize the identified transcription from the SR engine. In a speech therapy application, the SM module identifies one or more phonological processes, if any, associated with the user's speech. In an automated attendant application, the SM module recognizes text associated with the identified transcription.

For speech therapy applications, an ASR tool of the present invention can analyze speech and automatically determine and provide statistics on the key phonological disorders that are discovered in a patient's speech. Such a program offers great benefit to the therapist and to the patient by allowing the therapy to continue outside the therapist's office. ASR tools of the present invention can also be employed in other contexts, such as foreign language instruction.

The present invention addresses the growing interest in automated, computer-based tools for speech therapy and foreign language instruction that reduce the need for direct therapist/instructor supervision and provide quantitative measures to show the effectiveness of speech therapy or language instruction programs.

BRIEF DESCRIPTION OF THE DRAWINGS

Other aspects, features, and advantages of the invention will become more fully apparent from the following detailed description, the appended claims, and the accompanying drawings in which like reference numerals identify similar or identical elements.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments.

Exemplary Speech Therapy Application

Figure 1:
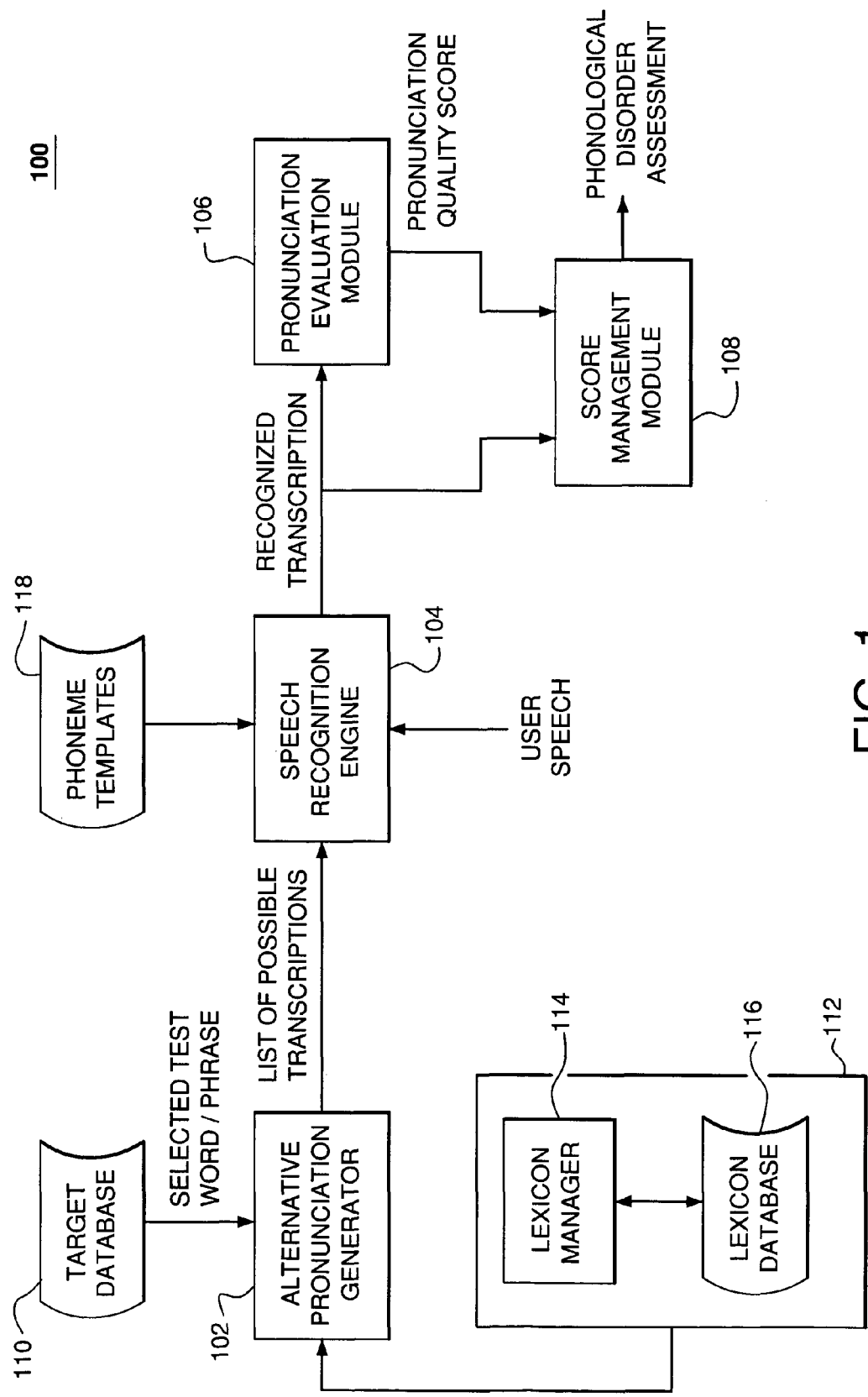
FIG. 1 shows a block diagram depicting the components of a speech therapy system for automatic assessment of phonological disorders, according to one embodiment of the present invention.

FIG. 1 shows a block diagram depicting the components of a speech therapy system 100 for automatic assessment of phonological disorders. Although preferably implemented in software on a conventional personal computer (PC), system 100 may be implemented using any suitable combination of hardware and software on an appropriate processing platform.

For each of a plurality of test word or phrases (i.e., targets), system 100 generates one or more alternative phonetic transcriptions that correspond to known phonological disorders to generate a list of possible transcriptions for the current test target, which list includes the base (i.e., correct) transcription and the one or more alternative (i.e., incorrect) transcriptions. When a user of system 100 (e.g., a speech therapy patient) pronounces one of the test targets into a microphone connected to system 100, the system compares the user's speech to the corresponding list of possible transcriptions and selects the one that most closely matches the user's. System 100 compiles statistics on the user's speech for a sufficient number and variety of different test targets to diagnose, if appropriate, the user's phonological disorder(s). Depending on the implementation, system 100 may then be able to use that diagnosis to appropriately control and tailor the flow of the speech therapy session for the individual user, e.g., focusing on test targets that are likely to be affected by the user's disorder(s).

Speech therapy system 100 has four main processing components: alternative pronunciation (AP) generator 102, speech recognition (SR) engine 104, pronunciation evaluation (PE) module 106, and score management (SM) module 108, each of which is responsible for a different phase of the system's functionality.

For a given test target, AP generator 102 automatically generates one or more alternative phonetic transcriptions that correspond to common phonological processes. For example, phonological processes for the two-phoneme cluster /dr/ in the word (drum) include /d/ as in (dum), /dw/ as in (dwum), and /d$_3$/ as in (jum). Moreover, phonological processes for the phoneme /d/ in (dum) include /g/ as in (gum). In that case, AP generator 102 might generate a list of possible phonetic transcriptions for the test word (drum) that includes the base transcription (drum) as well as the alternative transcriptions (dum), (dwum), (d$_3$um), and (gum), where the alternative transcription (gum) corresponds to a first phonological process replacing the /dr/ in (drum) with /d/, which is in turn replaced with /g/ as a result of another interacting/ordered phonological process.

In addition, the list of possible transcriptions for the test word (drum) generated by AP generator 102 might include additional alternative transcriptions resulting from phonological processes corresponding to the other phonemes in (drum), such as the phoneme /^/ for the letter "u" in (drum) and the phoneme /m/ in (drum). According to a preferred implementation, if, for example, the phoneme /b/ as in (bees) were a phonological process for the phoneme /m/ in (drum), then, in addition to applying that phonological process to the target word (drum) to generate an alternative transcription corresponding to (drub), AP generator 102 would also apply that same phonological process to other possible transcriptions in the list (i.e., (dum), (dwum), (d$_3$um), and (gum)) to generate additional alternative transcriptions corresponding to (dub), (dwub), (d$_3$ub), and (gub), each of which corresponds to a combination of phonological processes affecting different parts of the same test word.

The inclusion of alternative transcriptions resulting from other interacting/ordered phonological processes as well as from combinations of two or more different phonological processes means that, for a typical test word or phrase, AP generator 102 might generate a relatively large number of different possible transcriptions corresponding to a wide variety of different phonological processes. The alternate pronunciation generator may also include an additional pronunciation validation module to remove any phonologically spurious transcriptions that are generated.

Figure 2:
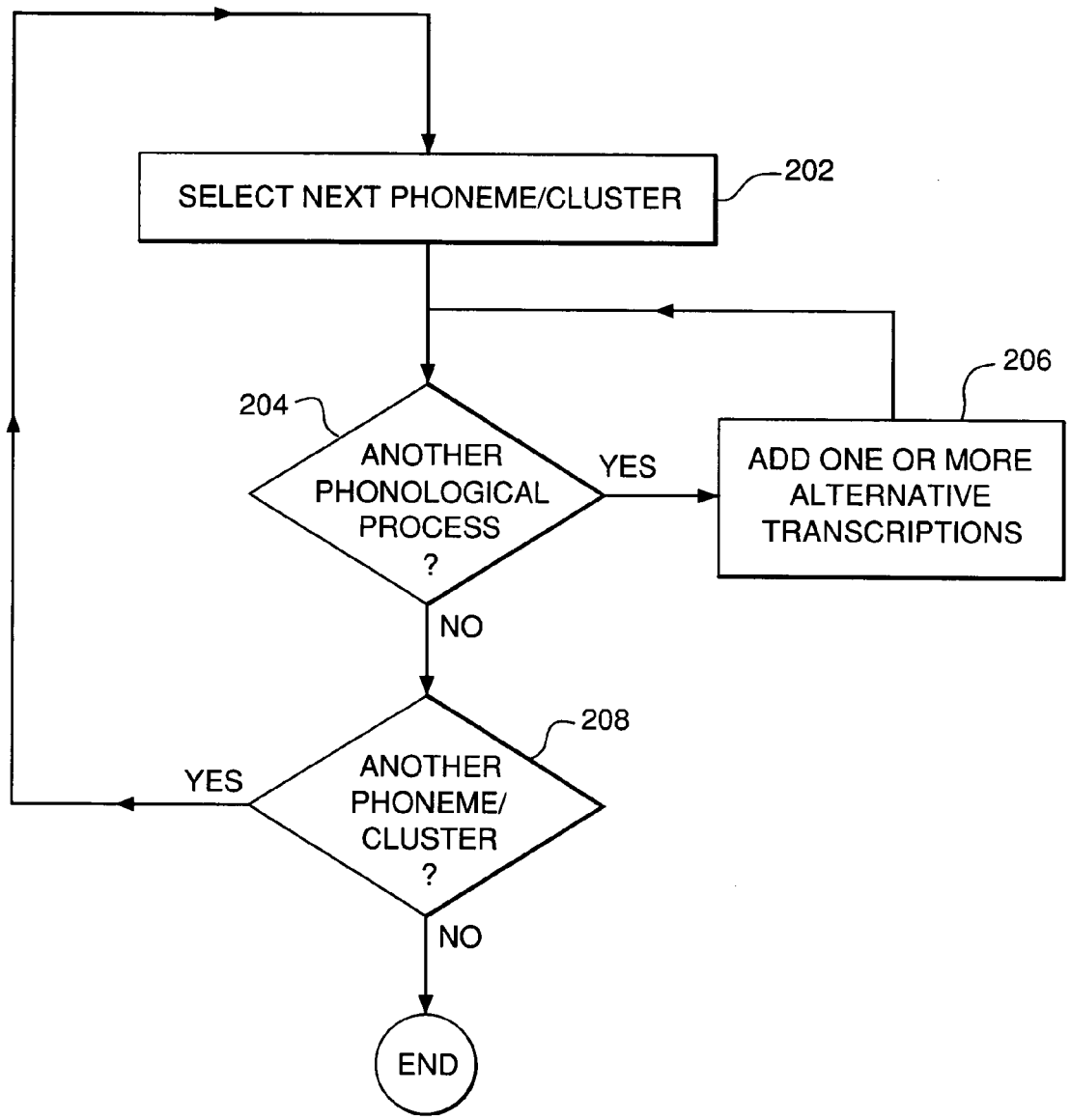
FIG. 2 shows a flow diagram of the processing implemented by the alternative pronunciation generator of FIG. 1.

FIG. 2 shows a flow diagram of the processing implemented by alternative pronunciation generator 102, according to one embodiment of the present invention. In particular, AP generator 102 examines each different base phoneme and each different cluster of base phonemes in the base transcription for the current test target (steps 202 and 208), determines whether there are any phonological processes associated with that phoneme/cluster (step 204), and generates, from the existing list of possible transcriptions, one or more additional alternative transcriptions for the list by applying each different phonological process for the current phoneme/cluster to the appropriate possible transcriptions in the list (step 206).

Steps 202 and 208 sequentially select each individual phoneme in the test target, each two-phoneme cluster (if any), each three-phoneme cluster (if any), etc., until all possible phoneme clusters in the test target have been examined. For example, the word (striking) has seven phonemes corresponding to (s), (t), (r), (i), (k), (i), and (ng), two-phoneme clusters corresponding to (st) and (tr), and one three-phoneme cluster corresponding to (str). As such, AP generator 102 would sequentially examine all ten phonemes/clusters in the test word (striking).

In one implementation, for step 204, AP generator 102 may rely on a look-up table that contains all phonemes and all phoneme clusters that can be modified/deleted as a result of a specific phonological process and the corresponding replacement phoneme/cluster. As described previously, any given phoneme/cluster may have one or more different possible phonological processes associated with it as well as one or more interacting processes. Moreover, some phonological processes may be applied across word boundaries in a test phrase.

For step 206, for the current phonological process for the current phoneme, AP generator 102 applies the phonological process to the existing list of possible transcriptions to generate one or more additional alternative transcriptions for the list by replacing the current phoneme with the corresponding replacement phoneme. Note that the replacement phone may be "NULL" indicating a phoneme deletion. In this way, the list of possible transcriptions generated by AP generator 102 can grow exponentially as the set of different phonemes and clusters in a word are sequentially examined.

In an alternative implementation, AP generator 102 generates a set of possible phonemes and clusters for each phoneme and cluster in the current test target, where, for a given phoneme/cluster in the target, the set comprises the base phoneme/cluster itself as well as any replacement phonemes/clusters corresponding to known phonological processes. After all of the different sets of possible phonemes/clusters have been generated for all of the different phonemes/clusters in the test target, AP generator 102 systematically generates the list of possible transcriptions by generating different combinations of phonemes/clusters, where each combination has one of the possible phonemes/clusters for each base phoneme/cluster in the target. The resulting list of possible transcriptions should be identical to the list generated by the method of FIG. 2.

As indicated in FIG. 1, AP generator 102 receives information from target database 110 and lexicon sub-system 112, which includes lexicon manager 114 and lexicon database 116. Target database 110 stores the set of test words and phases to be spoken by a user for the assessment of phonological disorders. This database is preferably created by a speech therapist off-line (e.g., prior to the therapy session).

Lexicon manager 114 enables the therapist to add/remove words and phrases as test targets for a particular user and to manage the phonetic transcriptions for those test targets. For example, for individual test targets, lexicon manager 114 might allow the therapist to manually add other alternative transcriptions corresponding to abnormal phonological processes that are not automatically generated by alternative pronunciation generator 102. Lexicon database 116 is a dictionary containing base transcriptions for all of the test targets in target database 110.

AP generator 102 uses the information received from target database 110 and lexicon sub-system 112 to generate a list of possible transcriptions for the current test target for use by speech recognition engine 104.

In a preferred implementation, alternative pronunciation generator 102 operates in a text domain, while speech recognition engine 104 operates in an appropriate parametric domain. That is, each of the possible transcriptions generated by AP generator 102 is represented in the text domain by a corresponding set of phonemes identified by their phonetic characters, while SR engine 104 compares a parametric representation (e.g., based on Markov models) of the user's spoken input to analogous parametric representations of the different possible transcriptions and selects the transcription that best matches the user's input. Because of these two different domains (text and parametric), the list of possible transcriptions generated in the text domain by AP generator 102 must get converted into the parametric domain for use by SR engine 104.

In a preferred implementation, that text-to-parametric conversion occurs in SR engine 104 based on information retrieved from phoneme template database 118, which contains a mapping for each phoneme from the text domain into the parametric domain. The phoneme templates are typically built from a large speech database representing the correct speech for different phonemes. One possible form of speech templates is as Hidden Markov Models (HMMs), although other approaches such as neural networks and dynamic time-warping can also be used.

SR engine 104 identifies the transcription in the list of possible transcriptions received from AP generator 102 that best matches the user's input based on some appropriate measure in the parametric domain. In one embodiment, the Viterbi algorithm is used to determine the transcription that has the maximum likelihood of representing the input speech. See G. D. Forney, "The Viterbi Algorithm," Proceedings of the IEEE, Vol. 761, No. 3, March 1973, pp. 268-278. SR engine 104 provides the selected transcription to both pronunciation evaluation module 106 and score management module 108.

Pronunciation evaluation module 106 evaluates the quality of speech in the transcription selected by SR engine 104 as being the one most likely to have been spoken by the user. In a preferred implementation, the processing of PE module 106 is based on the subject matter described in the Gupta 8-1-4 application. The resulting pronunciation quality score generated by PE module 106 is provided to score management module 108 along with the selected transcription from SR engine 104.

Score management module 108 maintains score statistics and the current assessment of phonologic processes based upon all previous practice attempts by a user. The cumulative statistics and trend analysis based upon all the data enables overall assessment of phonological disorders. Depending on the implementation, this diagnosis of phonological disorders may be derived by a therapist reviewing the test results or possibly generated automatically by the system.

Figure 3:
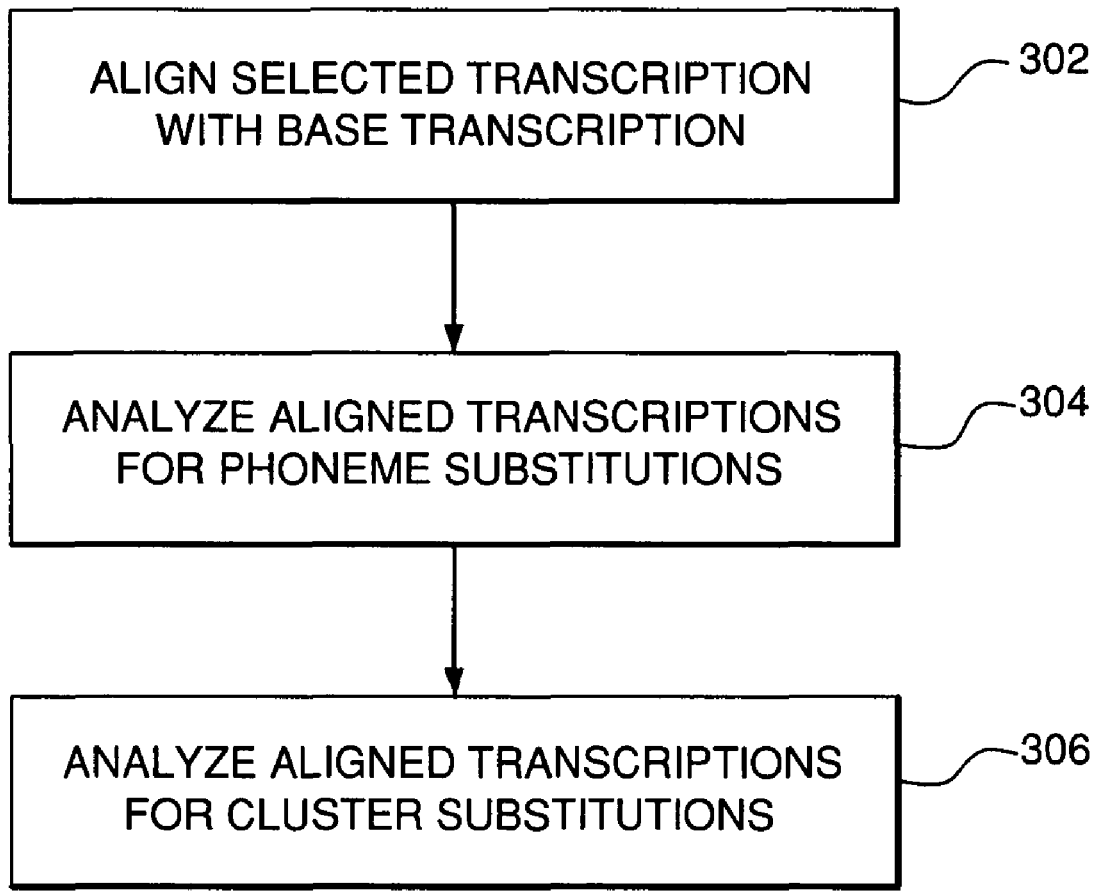
FIG. 3 shows a block diagram of the processing implemented by the score management module of FIG. 1 to determine the one or more phonological processes, if any, associated with a user's speech for a given test target.

FIG. 3 shows a block diagram of the processing implemented by SM module 108 to determine the one or more phonological processes, if any, associated with a user's speech for a given test target. In the text domain, SM module 108 aligns the transcription selected by SR engine 104 and the base (correct) target transcription using any suitable, well-known algorithm for aligning transcriptions (step 302 of FIG. 3). The resulting alignment of transcriptions indicates insertions, deletions, and/or substitutions of phonemes such that some appropriate phonological distance measure between the two transcriptions is minimized. An example of a phonological distance measure is the number of phonological features that are different between two transcriptions, where the distance measure is minimized at alignment.

For the aligned transcriptions, SM module 108 determines the corresponding phonological processes, if any. This may be accomplished by first looking for all possible substitutions of single phonemes in a look-up table that associates such substitutions with a corresponding phonological process (step 304). Once this is completed, clusters of two or more phonemes are searched for any process that affects such clusters (e.g., cluster reduction, syllable deletion) (step 306). Note that the processing of steps 304 and 306 is essentially the reverse of the process used by AP generator 102 to generate alternative transcriptions.

Figure 4:
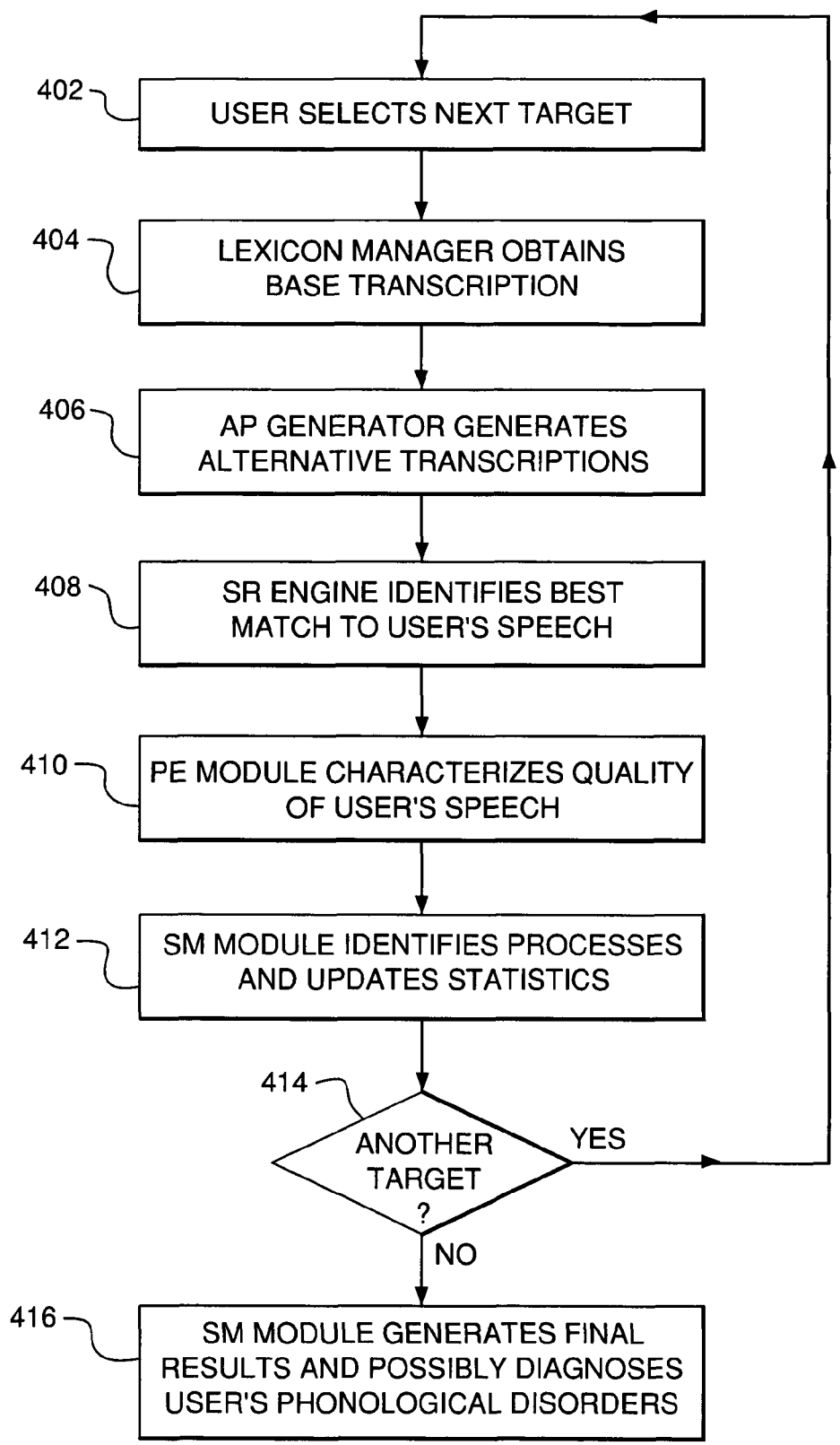
FIG. 4 shows a high-level flow diagram of the overall processing implemented by the speech therapy system of FIG. 1.

FIG. 4 shows a high-level flow diagram of the overall processing implemented by system 100. When a user (e.g., a speech therapy patient) selects a test word or phrase from target database 110 (step 402 of FIG. 4), lexicon manager 114 obtains the base transcription from lexicon database 116 (step 404). Alternative pronunciation generator 102 generates alternative transcriptions corresponding to different phonological disorders (step 406). Speech recognition engine 104 uses phoneme template database 118 to generate a parametric representation of each different possible transcription for the current target and compares those parametric representations to a parametric representation of the user's speech for the test target to identify the possible transcription that most closely matches the user's speech (step 408). Pronunciation evaluation module 106 characterizes the quality of the user's speech (step 410). Score management module 108 identifies the phonological process(es) that produced the identified transcription from the base transcription and compiles corresponding statistics over all of the test targets (step 412). The processing of steps 402-412 is implemented for a number of different test targets (step 414). Although not shown in FIG. 4, the processing of steps 408-412 may also be performed for the same target based on different speech attempts by the user. After all of the different targets have been tested (step 414), SM module 108 computes a list of phonological processes associated with the user and their frequencies of occurrence (step 416). Depending on the implementation, SM module 108 may also generate a diagnosis of the user's phonological disorder(s).

Depending on the implementation, system 100 may have additional components that present the target words/phrases to the user, play back speech data to the user, and present additional cues such as images or video clips.

As described above, system 100 has direct application in speech therapy. In particular, system 100 can support speech therapy that determines an optimal intervention program to remedy phonological disorders. System 100 enables a quick and accurate assessment of a patient's phonological disorders. System 100 provides automatic processing that requires virtually no intervention on the part of a therapist. As such, the patient can use this tool in the privacy and convenience of his or her own home or office, with the results being review later by a therapist.

System 100 also has application in other contexts, such as foreign language instruction. In particular, system 100 can provide an approach by which the foreign language instruction can continue beyond the school to the home, thereby significantly accelerating language learning. System 100 functions as a personal instructor when the student is away from school. The student can also use the system to identify specific areas where he or she needs most improvement in speaking a language.

Exemplary Automated Attendant Application

In a typical automated attendant application, the computer-based attendant algorithm prompts the user to provide spoken inputs in response to a series of questions, where each question has a finite number of possible responses. In a prior-art automated attendant, the attendant's speech recognition engine would typically compare the user's speech to a set of phonetic transcriptions, each phonetic transcription corresponding to a different one of the possible responses, in order to select the phonetic transcription—and therefore—the response that most closely matches the user's speech. The speech recognition engine would make that comparison using templates corresponding to the phonemes that appear in the different phonetic transcriptions for the possible responses.

If the phoneme templates were generated using speech samples for users having a single accent, such an automated attendant would probably work very well for users having that same accent, but possibly not so well for users having other accents. If the phoneme templates were generated using a larger set of speech samples for users having a wider variety of different accents, the automated attendant might function at some level for a wider variety of users, but perhaps not sufficiently well for any users. Moreover, prior-art automated attendants would typically have difficulty recognizing speech from users having specific phonological disorders.

As a particular example, an automated attendant might present an image of a dog to a user and ask him/her to select from among four possible responses: cat, dog, horse, or cow. If the user has a specific phonological disorder that causes the user to pronounce "dog" as "gog," then the automated attendant might not be able to recognize the user's spoken input as being any of the four possible responses.

Figure 5:
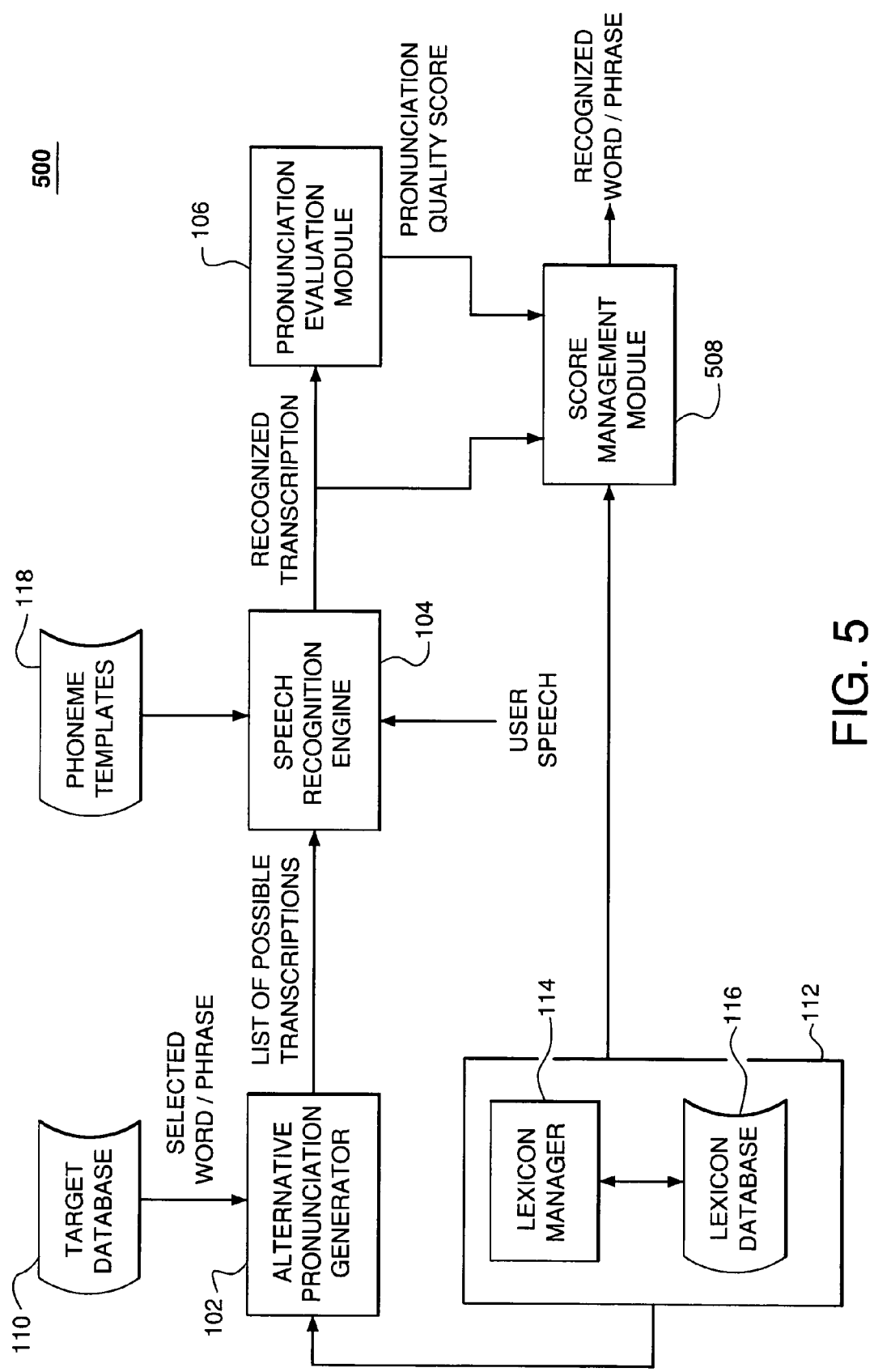
FIG. 5 shows a block diagram depicting the components of an automated attendant system, according to one embodiment of the present invention.

According to embodiments of the present invention, an automated attendant application can be implemented using an architecture similar to that of speech therapy system 100 of FIG. 1. FIG. 5 shows the components involved in the speech recognition processing of such an automated attendant system 500, according to one possible embodiment of the present invention. The components of automated attendant system 500 are basically the same as those of speech therapy system 100, with the exception of the score management module. In particular, instead of assessing the particular phonological disorder(s) of the user, score management module 508 of FIG. 5 generates an output corresponding to the recognized word or phrase spoken by the user. System 500 would typically be part of a larger automated attendant application that would (1) prompt the user to provide user speech inputs to system 500 and then (2) process the user's words/phrases recognized by system 500 as part of the automated attendant's overall algorithm.

For a given attendant question having a finite number of possible responses, for each different possible response contained in target database 110, lexicon sub-system 112 would provide (at least) one base transcription to alternative pronunciation generator 102, which would generate a list of possible phonetic transcriptions for each base transcription. Depending on the implementation, the different possible transcriptions could be based on a range and variety of phonological processes corresponding to different phonological disorders and/or accents.

Continuing with the example of an automated attendant asking the user to identify the image of a dog as being either a cat, dog, horse, or cow, alternative pronunciation generator 102 would generate a list of possible phonetic transcriptions for each different base transcription for each different possible response. As such, AP generator 102 would generate a number of different possible transcriptions for each of the different possible responses cat, dog, horse, and cow. In particular, the list of possible phonetic transcriptions for the response "dog" would include phonetic transcriptions for both "dog" and "gog," among others.

Speech recognition engine 104 would then compare the user's speech to all of the different phonetic transcriptions. In order for SR engine 104 to recognize one of the possible responses, the user's speech only has to match sufficiently one of the different phonetic transcriptions. For example, if the user has a particular speech disorder causing him to pronounce "dog" as "gog," then SR engine 104 would match the user's speech to the phonetic transcription for "gog," and score management module 508 will accurately identify the user's speech as corresponding to the response "dog."

As a result, using principles of the present invention, speech recognition engine 104 can be implemented with a very high likelihood of accurately recognizing responses spoken by users for a wide range and variety of different accents and/or phonological disorders.

Although the present invention has been described in the context of speech therapy, language instruction, and automated attendant applications, the present invention can also be implemented in other contexts that rely on automatic speech recognition processing, such as (without limitation) word processing and command & control applications.

The invention may be implemented as circuit-based processes, including possible implementation as a single integrated circuit, a multi-chip module, a single card, or a multi-card circuit pack. As would be apparent to one skilled in the art, various functions of circuit elements may also be implemented as processing steps in a software program. Such software may be employed in, for example, a digital signal processor, micro-controller, or general-purpose computer.

The invention can be embodied in the form of methods and apparatuses for practicing those methods. The invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

We claim:

1. A computer system comprising:
   (a) an alternative pronunciation (AP) generator adapted to (1) identify one or more phonological processes for one or more base phonemes/clusters in a target, (2) select one or more replacement phonemes/clusters corresponding to the one or more identified phonological processes, and (3) generate one or more alternative transcriptions for the target from different combinations of the one or more base phonemes/clusters in the target and the one or more replacement phonemes/clusters;
   (b) a speech recognition (SR) engine adapted to (1) compare a user's speech for the target to a list of possible transcriptions including a base transcription for the target and the one or more alternative transcriptions and (2) identify a transcription in the list that best matches the user's speech; and
   (c) a score management (SM) module adapted to characterize the identified transcription to identify one or more phonological processes, if any, associated with the user's speech.

2. The invention of claim 1, wherein the SM module is further adapted to compile statistics on the phonological processes associated with a plurality of targets for use in diagnosing one or more phonological disorders of the user.

3. The invention of claim 2, wherein the SM module is further adapted to generate a diagnosis of a phonological disorder for the user.

4. The invention of claim 1, wherein the SM module aligns the identified transcription with the base transcription to identify the one or more phonological processes associated with the user's speech.

5. The invention of claim 1, further comprising a pronunciation evaluation module adapted to characterize quality of the user's speech.

6. The invention of claim 1, wherein the SM module is adapted to recognize text associated with the identified transcription.

7. The invention of claim 1, wherein at least one of the alternative transcriptions corresponds to an interacting/ordered phonological process associated with a single base phoneme/cluster in the target.

8. The invention of claim 1, wherein at least one of the alternative transcriptions corresponds to two or more phonological processes associated with two or more different base phonemes/clusters in the target.

9. The invention of claim 1, wherein the SR engine compares the user's speech to the list of possible transcriptions in a parametric domain.

10. The invention of claim 9, wherein the AP generator generates the alternative transcriptions in a text domain.

11. The invention of claim 10, wherein the SR engine converts the list of possible transcriptions from the text domain to the parametric domain using a database of phoneme templates that contains a mapping of each different phoneme from the text domain to the parametric domain.

12. The invention of claim 1, wherein, to identify the one or more phonological processes for the one or more base phonemes/clusters in the target, the AP generator is adapted to access a look-up table that contains one or more phonemes/clusters that can be modified as a result of each of a plurality of specified phonological processes and the corresponding replacement phoneme/cluster.

13. A computer-based method comprising:
   (a) identifying one or more phonological processes for one or more base phonemes/clusters in a target;
   (b) selecting one or more replacement phonemes/clusters corresponding to the one or more identified phonological processes;
   (c) generating one or more alternative transcriptions for the target from different combinations of the one or more base phonemes/clusters in the target and the one or more replacement phonemes/clusters;
   (d) comparing a user's speech for the target to a list of possible transcriptions including a base transcription for the target and the one or more alternative transcriptions in order to identify a transcription in the list that best matches the user's speech; and
   (e) characterizing the identified transcription to identify one or more phonological processes, if any, associated with the user's transcription.

14. The invention of claim 13, further comprising compiling statistics on the phonological processes associated with a plurality of targets for use in diagnosing one or more phonological disorders of the user.

15. The invention of claim 14, further comprising generating a diagnosis of a phonological disorder for the user.

16. The invention of claim 13, wherein the identified transcription is characterized to recognize text associated with the identified transcription.

17. The invention of claim 13, wherein the user's speech is compared to the list of possible transcriptions in a parametric domain.

18. The invention of claim 17, wherein:
the alternative transcriptions are generated in a text domain; and
the list of possible transcriptions are converted from the text domain to the parametric domain using a database of phoneme templates that contains a mapping of each different phoneme from the text domain to the parametric domain.

19. The invention of claim 13, wherein, to identify the one or more phonological processes for the one or more base phonemes/clusters in the target, step (a) comprises accessing a look-up table that contains one or more phonemes/clusters that can be modified as a result of each of a plurality of specified phonological processes and the corresponding replacement phoneme/cluster.

20. A computer-based method for generating one or more alternative transcriptions for a target comprising, for one or more base phonemes/clusters in the target:
(a) identifying one or more phonological processes for the one or more base phonemes/clusters in the target;
(b) selecting one or more replacement phonemes/clusters corresponding to the one or more identified phonological processes; and
(c) generating the one or more alternative transcriptions for the target from different combinations of the one or more base phonemes/clusters in the target and the one or more replacement phonemes/clusters.

21. The invention of claim 20, wherein at least one of the alternative transcriptions corresponds to an interacting/ordered phonological process associated with a single base phoneme/cluster in the target.

22. The invention of claim 20, wherein at least one of the alternative transcriptions corresponds to two or more phonological processes associated with two or more different base phonemes/clusters in the target.

23. The invention of claim 20, wherein, to identify the one or more phonological processes for the one or more base phonemes/clusters in the target, step (a) comprises accessing a look-up table that contains one or more phonemes/clusters that can be modified as a result of each of a plurality of specified phonological processes and the corresponding replacement phoneme/cluster.

* * * * *